United States Patent [19]

Dagan et al.

[11] Patent Number: 4,721,830

[45] Date of Patent: Jan. 26, 1988

[54] CABLE ENCLOSURE

[75] Inventors: Gideon B. Dagan, Santa Monica; Charles W. Waas, Huntington Beach, both of Calif.

[73] Assignee: Communications Technolgy Corporation, Los Angeles, Calif.

[21] Appl. No.: 66,309

[22] Filed: Jun. 25, 1987

[51] Int. Cl.$^4$ .................... H02G 15/113; H02G 7/08
[52] U.S. Cl. ........................................ 174/41; 174/92
[58] Field of Search .............................. 174/41, 92, 93

[56] References Cited

U.S. PATENT DOCUMENTS

| | | | |
|---|---|---|---|
| 3,701,835 | 10/1972 | Eisele et al. | 174/41 |
| 3,836,696 | 9/1974 | Gressitt et al. | 174/41 |
| 3,971,894 | 7/1976 | Faust et al. | 174/41 |
| 4,229,616 | 10/1980 | Hotchkiss | 174/92 X |

FOREIGN PATENT DOCUMENTS

| | | | |
|---|---|---|---|
| 823804 | 9/1969 | Canada | 174/41 |
| 1419100 | 12/1975 | United Kingdom | 174/92 |

*Primary Examiner*—Laramie E. Askin
*Attorney, Agent, or Firm*—Harris, Kern, Wallen & Tinsley

[57] ABSTRACT

A cable enclosure for enclosing electrical cable splices, typically telephone cables. An elongate housing having first and second housing members joined together along one edge for movement between housing open and closed conditions, and an elongate header for attachment to a messenger cable, with the housing members being closable about the header. A suspension system is provided for supporting the housing members from the header when in the open condition providing free access to the cables during the splicing operation. The housing members have replaceable end plates for handling various numbers of cables through each end plate.

23 Claims, 13 Drawing Figures

CABLE ENCLOSURE

BACKGROUND OF THE INVENTION

This invention relates to enclosures for electrical cables, and in particular to a new and improved enclosure suitable for use in enclosing splices in telephone cables, which is sometimes referred to as a free breathing aerial enclosure.

In a typical installation, the telephone cables are supported overhead on a messenger cable and conductors in the various cables are spliced togeher by a workman while in the overhead position, and the resultant splices are enclosed in a protective enclosure.

One type of enclosure used in the past is in the form of a flexible boot or sleeve having an axial slit or opening along one side. After the electrical splicing has been completed, the sleeve is spread apart and positioned over the splice and the cables. Typically the sleeve is tapered at the ends to provide a closer fit with the cables themselves. Various types of fasteners are used for closing the sleeve along the slit, and sometimes a potting compound is introduced into the sleeve. Typical enclosures of this type are shown in U.S. Pat. Nos. 4,084,067; 4,084,066; 4,015,072; 3,916,086; and 3,916,082.

Another type of cable enclosure used in the past comprises two pieces generally semicircular in shape, with the two pieces being bolted or otherwise joined together about the splice and cables. Typically the two pieces are cast of metal or molded of a rigid plastic. Enclosures of this type are shown in U.S. Pat. Nos. 3,915,540 and 3,798,349.

Another type of enclosure sometimes used is a flexible sheet or sheets of material, typically plastic, which are wrapped around the splice and cables after completion of the splice. An enclosure of this type is shown in U.S. Pat. No. 3,557,298.

Cable splices are made by workmen in the field under difficult working conditions. The workman is up in the air at the cable height, working from a ladder or from an aerial platform. A dropped part or a dropped tool often means a trip to the ground for a replacement.

It is an object of the present invention to provide a new and improved cable enclosure which is very easy to work with in the air, and which is usable for enclosing an initial splicing operation, and equally usable with subsequent splices. An additional object of the inventor is to provide such a cable enclosure which can be installed and used as a single unit. An additional object is to provide such a cable enclosure which can be attached to a messenger cable, with all of the components assembled with the enclosure so that there are no loose parts for dropping or misplacing. It is another object of the invention to provide such a cable enclosure which can be removed from the cable splice area, exposing the splice area from all sides, while maintaining the cable enclosure suspended at the work site and ready for positioning about the splice when work is completed.

These and other objects, advantages, features and results will more fully appear in the course of the following description.

SUMMARY OF THE INVENTION

A cable enclosure for enclosing electrical cable splices including an elongated housing with first and second housing members, with the housing members joined along an edge for movement between closed and open conditions, and an elongate header having means for attachment to a messenger cable and means for engagement with the housing members as they are joined together at the header. The enclosure also includes a suspension arrangement for suspending the housing members from the header when in the open condition, providing access to the cables while maintaining the housing members ready for closure about the splice when completed.

In the preferred embodiment of the invention, an electrical conducting ground bar is carried in the header for a direct ground connection to the messenger cable and for direct ground connection to the cable sheaths and for supporting the cables and supporting the housing members.

The preferred embodiment also incorporates replaceable end plates for the ends of the housing members, with various end plates providing for various numbers of cables entering the housing, including blank end plates where no cable entry is desired.

DESCRIPTION OF THE PREFERRED EMBODIMENTS

Figure 1:
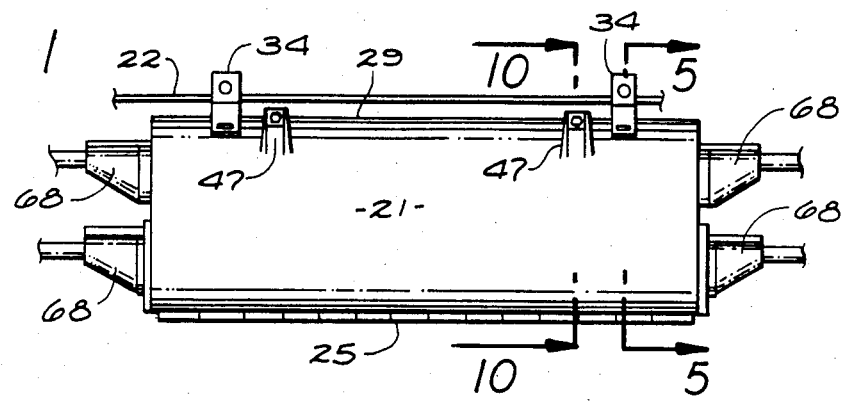
FIG. 1 is a side view of a cable enclosure installed on a messenger cable and incorporating the presently preferred embodiment of the invention.
Figure 2:
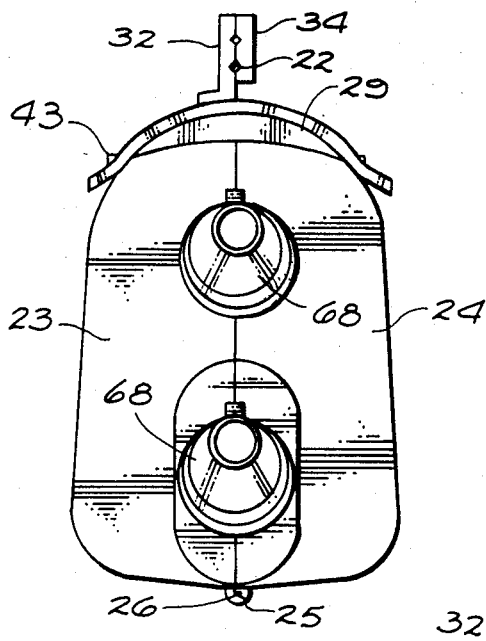
FIG. 2 is an enlarged end view of the enclosure of FIG. 1.

In FIGS. 1 and 2, a cable enclosure 21 is shown suspended from a messenger cable 22. The cable enclosure includes a housing formed of two housing members 23, 24 joined at a hinge 25. Typically the housing members are molded plastic shells, and may be identical so that both can be made from a single die. Typically the hinge comprises a plurality of molded tubular sections along the lower edge of the housing member, with the tubular sections along the lower edge of the housing of the opposed housing members can be aligned, with a metal rod 26 positioned through the aligned sections to serve as the hinge pin.

Figure 5:
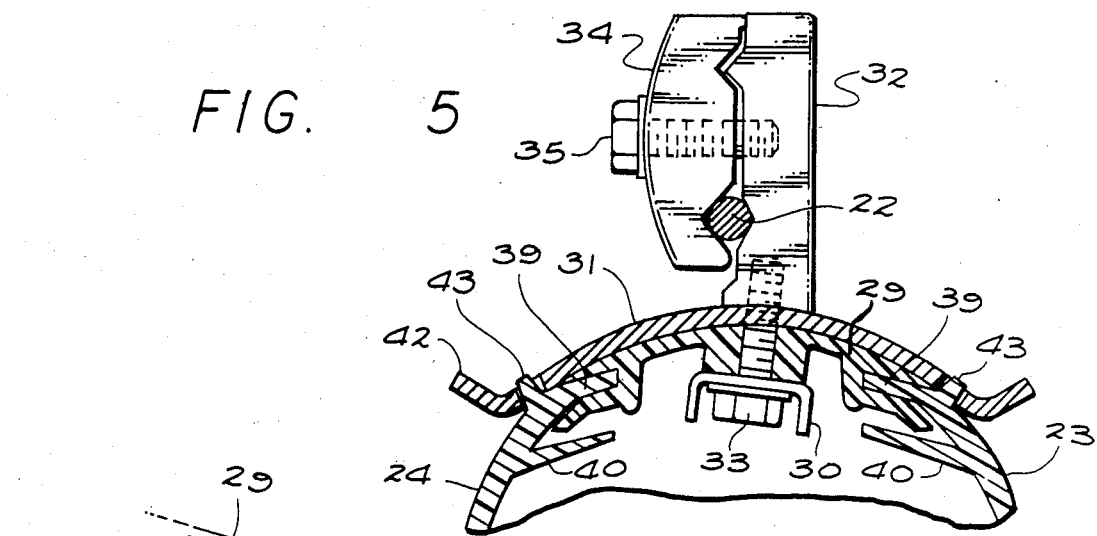
FIG. 5 is an enlarged partial sectional view taken along the line 5—5 of FIG. 1.

As best seen in FIG. 5, the cable enclosure also includes a header 29, a ground bar 30, and a latch bar 31, with these three components connected to a messenger attachment bar 32 by a bolt 33. The messenger cable 22 is clamped against the attachment bar 32 by a clamp 34 and bolt 35.

The header preferably is a plastic molding, and has spaced grooves 38 for receiving the upper edges 39 of the housing members 23, 24. Preferably, each of the housint members has an internal rib 40 which serves as an internal rain gutter for diverting moisture from the central portion of the interior of the housing.

Figure 6:
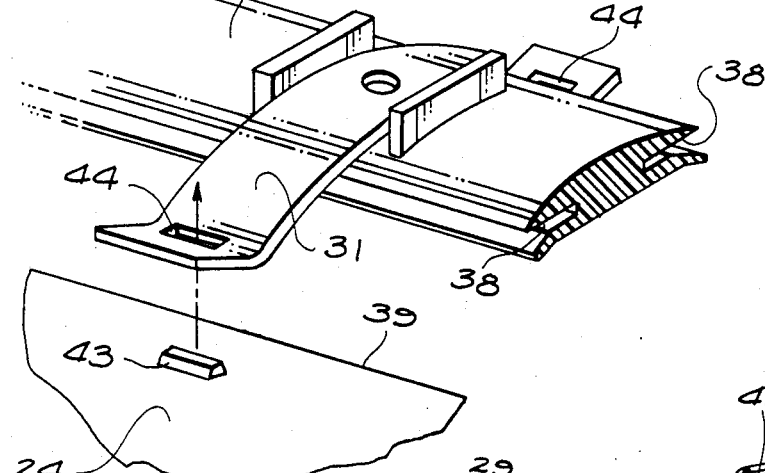
FIG. 6 is a perspective view illustrating the latching arrangement for the housing members and header of FIG. 5.

Typically there are two of the latch bars 31 and of the attachment bars 32, as seen in FIG. 1. The latch bar 31 typically is a piece of resilient metal, with ends 42 projecting beyond the header 29 and overlying the upper edges 39 of the housing members 23, 24. Bosses 43 are provided on the housing members adjacent the upper edges for engagement with corresponding slots 44 in the latch bar 31. This configuration is shown in the unlatched condition in FIG. 6 and in the latched condition in FIG. 5.

Figure 12:
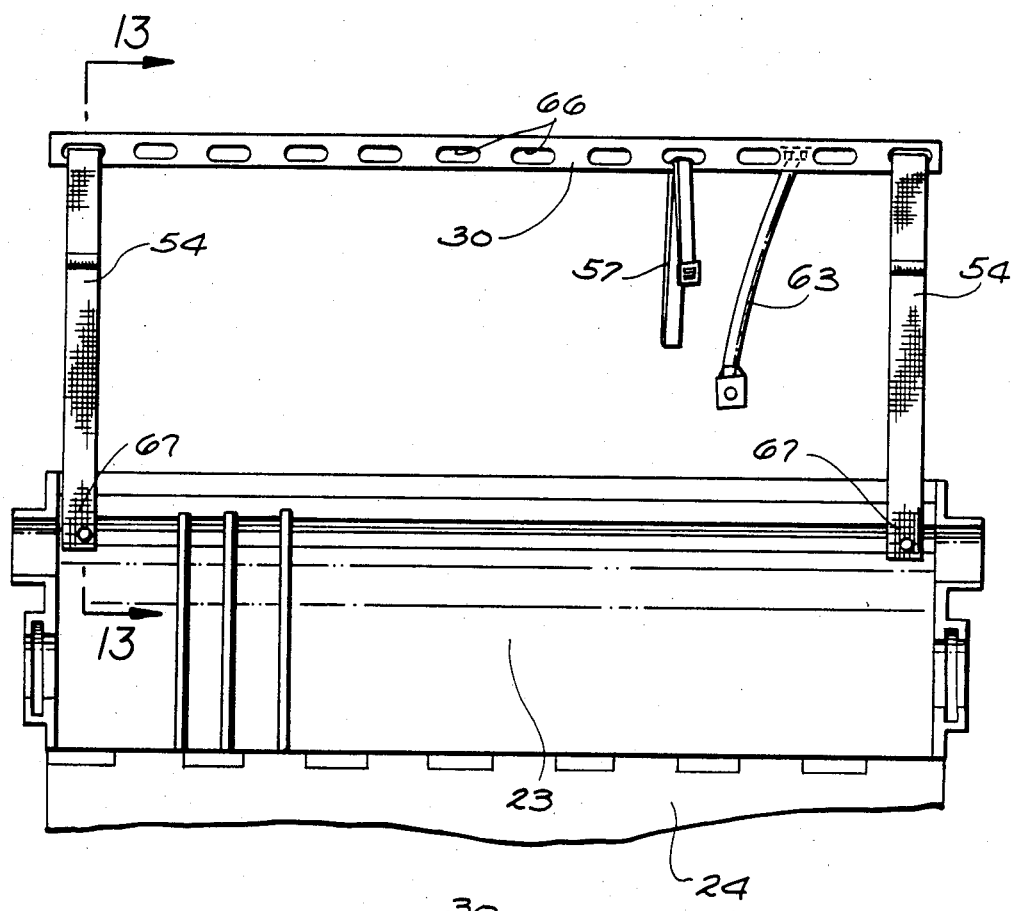
FIG. 12 is an enlarged partial side view of the configuration of FIG. 8 illustrating the suspension of the housing members.
Figure 13:
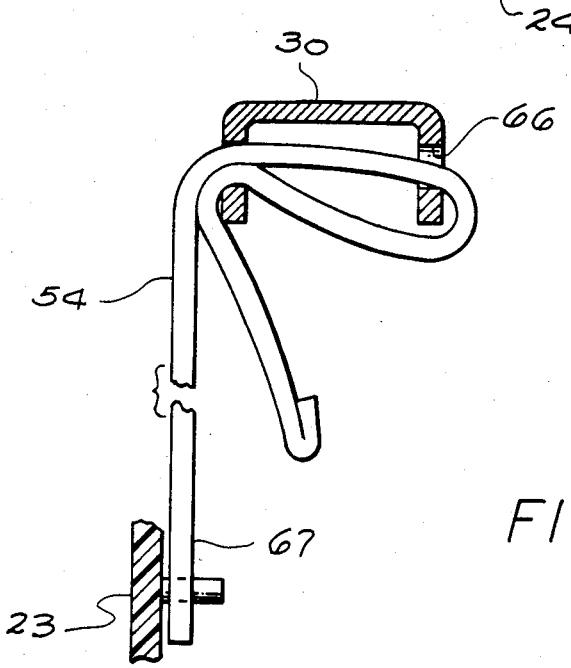
FIG. 13 is an end view of the configuration of FIG. 12.

The ground bar 30 typically is a metal channel which extends the length of the header, andis shown in greater detail in FIGS. 12 and 13. With the mounting configuration as shown in FIG. 5, there is a direct metallic ground between the ground bar 30, the bolt 33, the attachment bar 32, and the messenger cable 22. The flanges of the ground bar channel may be provided with slots and other openings for various purposes, some of which will be described hereinbelow.

Figure 10:
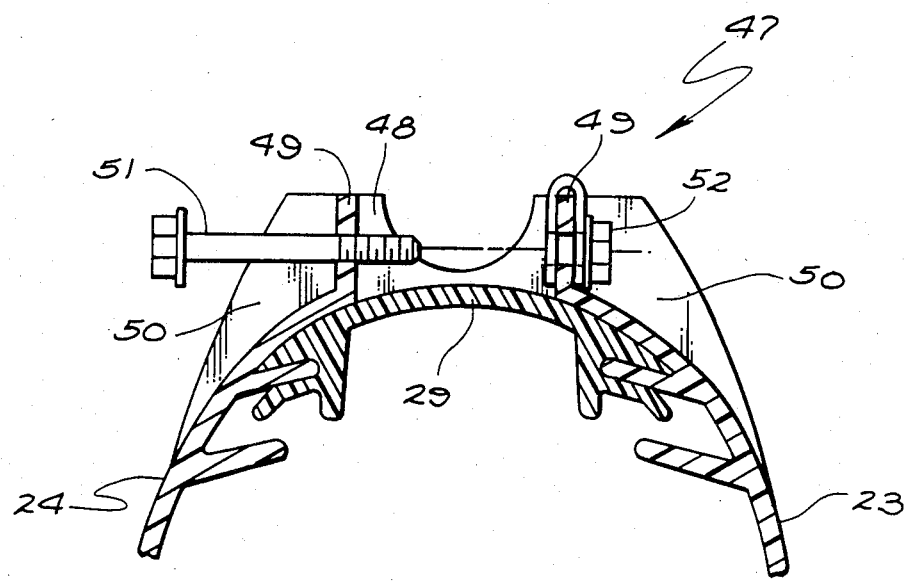
FIG. 10 is an enlarged partial sectional view taken along the line 10—10 of FIG. 1.
Figure 11:
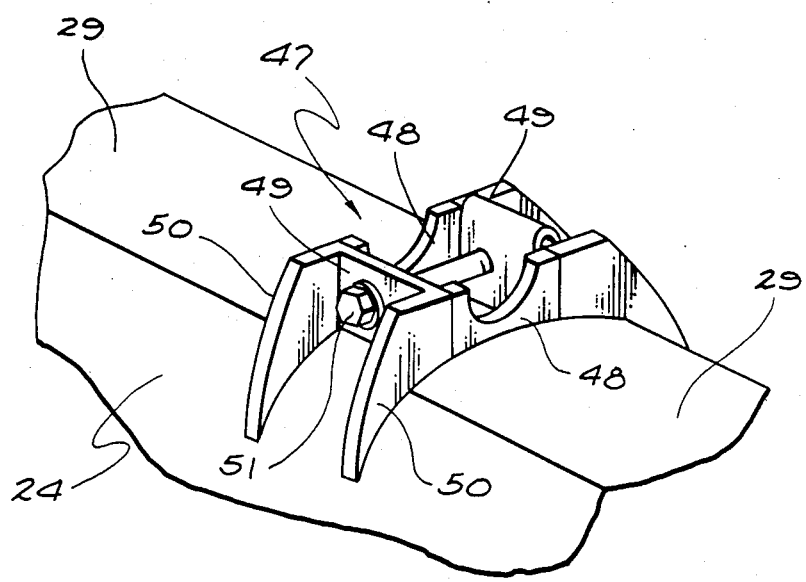
FIG. 11 is a perspective view illustrating the closure of FIG. 10.

Closure means 47 are provided on the enclosure for closing the housing members on the header, and are best shown in FIGS. 10 and 11. Two spaced transverse ribs 48 are carried on the header 29, and longitudinal ribs 49 are provided at the upper edges of the respective housing members 23, 24. Support flanges 50 preferably are formed integral with the respective ribs 49 and housing members. Bolt 51 with clerance on the bolt shaft between the head and the threaded end is carried in an opening in one of the ribs 49, for engagement with a captive nut 52 carried on the other rib 49. After the housing members are engaged with the latch bar 31, the bolts 51 are advanced to engage the respective nuts 52 and are tightened. Engagement of the housing member ribs 49 with the header ribs 48 limits the closing of the housing members on the header to prevent damage to the components by overtightening of the bolts.

Figure 8:
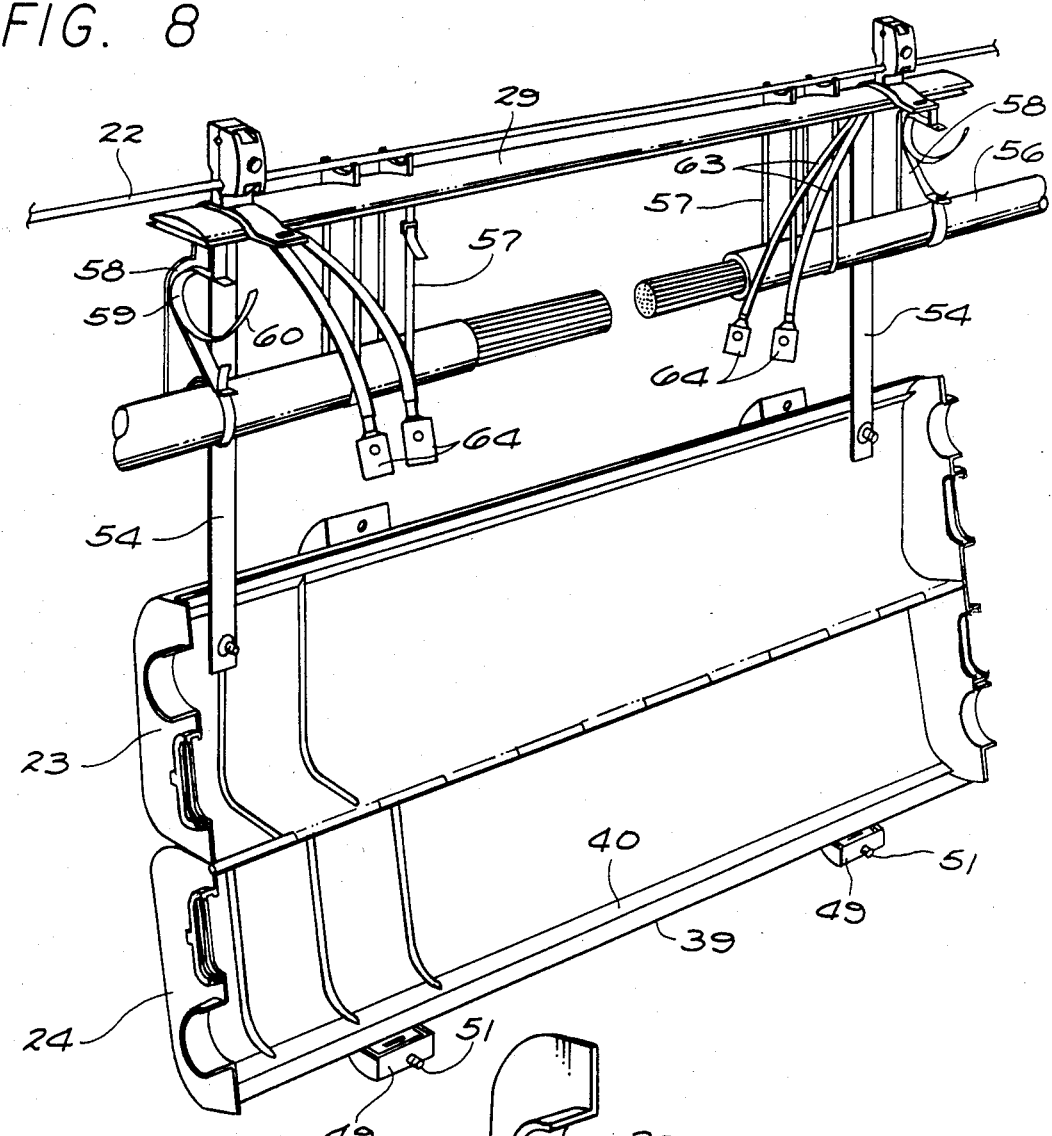
FIG. 8 is a view similar to that of FIG. 7, with the housing in the open and suspended condition.

The cable enclosure is shown in the fully open condition in FIG. 8, with the housing member 23 suspended from the header by straps 54 and with the housing member 24 suspended from the housing member 23 by the hinge. Cables 55, 56 are suspended below the header 29, by cable ties 57. An alternative arrangment for supporting the cables is also shown, comprising brackets 58 attached to the underside of the header 29, with each bracket having one or more curved supports 59 and associated strap 60 for strapping a cable against the support. One or the other or both types of cables support can be used as desired. FIG. 8 shows two cables entering the enclosure, but various numbers of cables can be utilized as dictated by the service. Arrangements for various numbers of cables will be described hereinbelow. A plurality of ground lines 63 is also incorporated in the cable enclosure. The ground lines may be conventional in construction, comprising an electrical conductor with an insulating coating, with the conductor connected at one end to the ground bar 30, and having a ground connector 64 at the other end for attachment to the ground sheath of a cable.

Referring to FIGS. 12 and 13, the flanges of the ground bar are provided with a plurality of slots 66. One end 67 of the strap 54 is threaded through the slots as shown in FIG. 13, and then attached to the housing member 23, as by positioning over a boss molded in the housing member, or by a rivet, or otherwise as desired. The other end of the strap is folded over on itself or otherwise increased in size so that it will not pass through the slots. The cable ties 57, which may be conventional wire or cable ties, also pass through the slots 66. The ground wire 63 is attached to the central portion of the ground bar 30 by a screw in the conventional manner.

Figure 3:
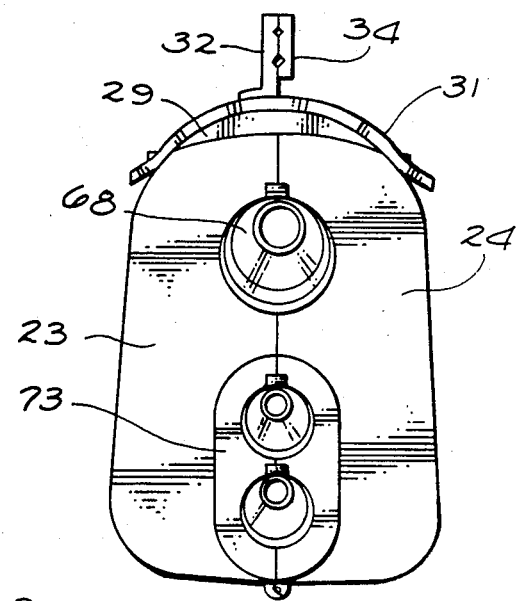
FIGS. 3 and 4 are views similar to that of FIG. 2 showing alternative configurations for the end plates of the housing.
Figure 4:
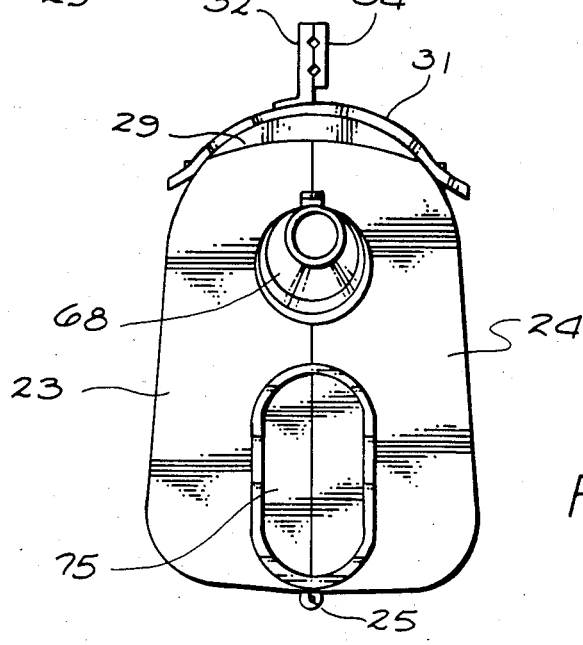

The cable enclosure of the invention is adapted for handling various numbers of cables, depending upon the specific requirement in the field. The enclosure shown in FIG. 1 is handling four cables, with each cable entering through a tapered boot 68 which may be conventional in design. The end view of FIG. 2 shows access for two cables. The alterative configuration of FIG. 3 shows access for three cables, while the alternative configuration of FIG. 4 shows access for a single cable. Each of the housing members has end sections 69, with the two end sections of the two housing members abutting when the housing is in the closed condition, to close the end of the housing.

Figure 9:
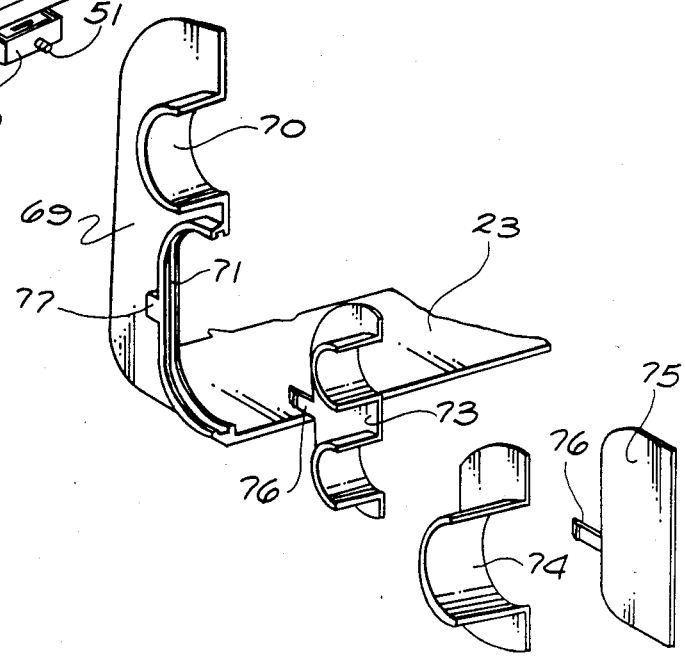
FIG. 9 is an exploded view illustrating the replaceable end plates for a housing member.

The end section construction is shown in greater detail in FIG. 9. A semicircular rim 70 and a semioval plate opening 71 are provided in the end section 69. The plate opening 71 has a channel configuration for slidingly receiving various end plates 73, 74, 75. Each of the end plates has a latch tongue 76 which engages a latch housing 77 on the end section, for latching the end plate in the end section. The end plate 73 has two of the semicircular rims 70, the end plate 74 has one semicircular rim, and the end plate 75 is blank. For the configuration of FIG. 2,the end plate 4 is used, for the configuration of FIG. 3, the end plate 73 is used, and for the configuration of FIG. 4, the end plate 75 is used. The latch tongue 76 is resilient so that the end plate can be pushed into the channel and the catch of the tongue deflected to engage the latch housing. Then when it is desired to change end plates, the latch tongue is manually depressed to release the latch, and the end plate is removed.

Figure 7:
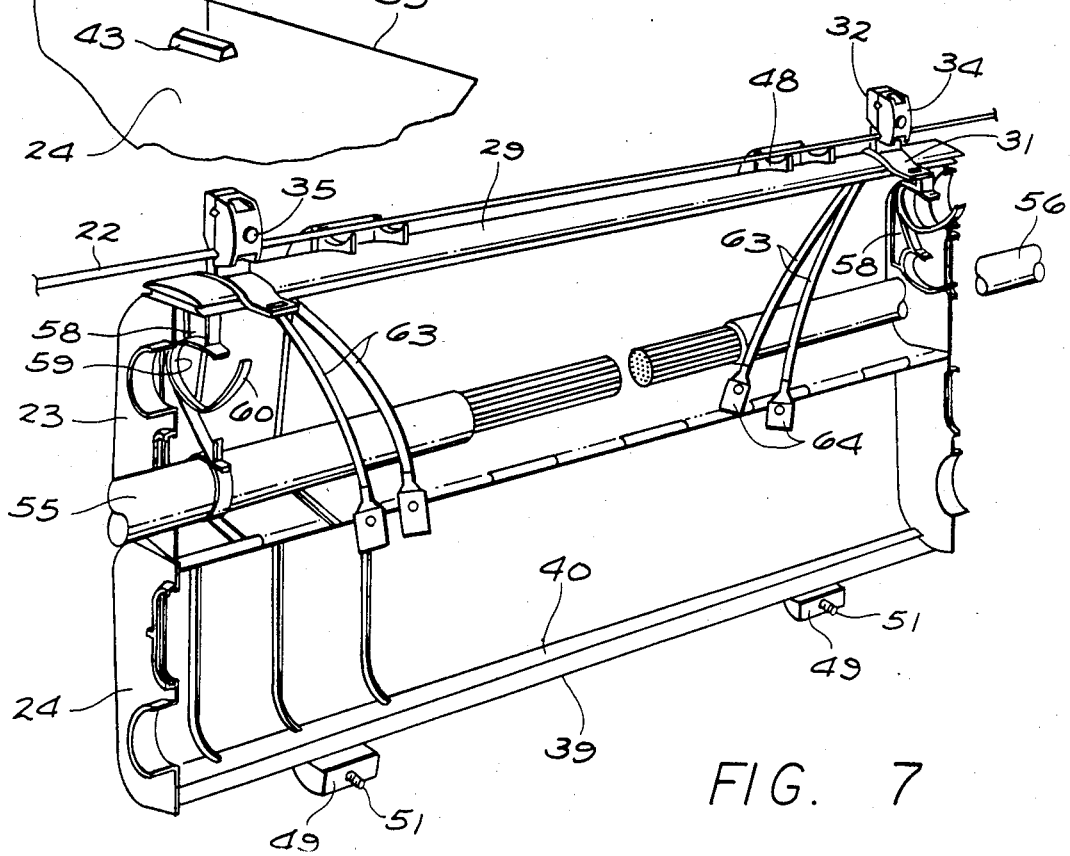
FIG. 7 is a perspective view of the enclosure of FIG. 1, with the housing in the open condition.

When a new splice is to be made, the workman determines the number and location of the cables which are involved. Then the appropriate end plates for each end of the housing are selected and inserted. The desired number of ground wires 63 are determined and installed. The housing is closed by engaging one of the housing members with the latch bars 31, as shown in FIG. 7, and then engaging the other housing member with the latch bars. The enclosure is now in the condition of FIG. 1 and is ready for attachment to the messenger cable. At this time, the enclosure is supported by the workman in position at the messenger cable, a clamp 34 is placed in position and the bolt 35 is tightened. This procedure is repeated for the other end of the enclosure, and the enclosure is now supported from the messenger cable.

The enclosure is opened to the position of FIG. 7 by manually pushing upward on the latch bars to release the housing member 24. The housing is then lowered to the position of FIG. 8, by releasing the housing member 23 from the latch bars. The cables to be spliced are placed in position and supported by the cable ties 57 and/or the cable brackets 58. The position of the housing members may be raised or lowered by adjusting the straps 54 in the ground bar 30. The workman now proceeds with the necessary splicing, having access to the cables from all sides.

Ater the splicing has been completed, the housing members are raised to the position of FIG. 7 and one housing member is engaged with the latch bars This is a simple operation which requires no tools. After visual inspection to ensure that all is in the proper position within the housing, the other housing member is engaged with the latch bars to close the housing, leaving the enclosure as shown in FIG. 1. The housing closures 47 are now engaged, by manually running the bolt 51 into the nut 52, and then tightening the bolt with a wrench or nut driver.

Typically the tapered boots 68 are connected to the respective end sections of the housing members by a tie line or other flexible connection, so as to be a connected component of the cable enclosure. Each boot is slid over the cable and then clamped onto the annular rim formed by the mating of two of the semicircular rims 70. This completes the installation of the cable enclosure.

When it is desired to carry out additional splicing or troubleshooting or the like, the procedure is reversed. The boots 68 are removed, the bolts 51 of the closures 47 are withdrawn from engagement with the corresponding nuts, one housing section is released from the latch bars and rotated downward to the open condition, the other housing section is released from the latch bars and the housing is lowered to the fully open condition of FIG. 8.

Thus it is seen that the cable enclosure when once installed on the messenger cable is a unitary structure without any loose parts and which may be opened and closed manually without requiring any complex manipulation and without requiring any tools except for the tightening and loosening of the messenger cable clamp bolts and the closure bolts.

We claim:

1. In a cable enclosure for enclosing electrical cable splices, the combination of:
    an elongate housing having first and second housing members each having first and second spaced edges, with said housing members joined together along said first edges for movement between a housing closed condition and a housing open condition;
    an elongate header having attachment means for attaching said header to a messenger cable;
    said housing members further including closure means for joining said housing members together adjacent said second edges with said header therebetween; and
    suspension means connected between said header and one of said housing members for supporting said housing members from said header when in said open condition.

2. A cable enclosure as defined in claim 1 wherein said header includes an upper crown with opposed outwardly facing slots for receiving said housing members second edges.

3. A cable enclosure as defined in claim 2 including spaced upwardly projecting first ribs on said header and upwardly projecting second ribs on said housing members adjacent said second edges, with said second ribs abutting said first ribs when said housing members are in said closed condition, and said closure means includes means for urging said second ribs of opposed housing members against the intervening first ribs.

4. A cable enclosure as defined in claim 3 including a latch bar carried on said header and projecting laterally from said header, and said housing members include latch means engageable with said projecting latch bar when a housing member second edge is positioned in a header slot.

5. A cable enclosure as defined in claim 4 including an electrical conducting ground bar carried by said header with said head attachment means providing an electrical path between said ground bar and the messenger cable.

6. A cable enclosure as defined in claim 5 wherein said ground bar is a downwardly opening channel with suspension slots formed in the opposed arms of said channel, and said suspension means includes a strap attached at one end to a housing member and having the other end threaded through suspension slots for adjusting the position of said housing with respect to said header when in said open condition.

7. A cable enclosure as defined in claim 1 including an electrical conducting ground bar carried by said header with said header attachment means providing an electrical path between said ground bar and the messenger cable.

8. A cable enclosure as defined in claim 7 wherein said ground bar includes a flange with suspension openings, and said suspension means includes a housing line attached at one end to a housing member and having the other end threaded through suspension openings for adjusting the position of said housing with respect to said header when in said open condition.

9. A cable enclosure as defined in claim 8 including a ground conductor fixed at one end to said ground bar and having a connector at the other end for connection to an electrical cable ground sheath.

10. A cable enclosure as defined in claim 9 including a cable suspension line positioned in a ground bar suspension opening for connection about a cable for supporting the cable from said ground bar.

11. A cable enclosure as defined in claim 1 including a cable bracket carried on said header and disposed within said housing when in said closed condition, said cable bracket including first and second spaced curved supports for receiving electrical cables, and a cable strap carried at each support for strapping a cable against said support.

12. A cable enclosure as defined in claim 1 wherein said housing members have end sections which cooperate to close an end of said housing when in said closed condition, with cooperating end sections including replaceable end plates with a pair of end plates having openings defining a cable passage.

13. A cable enclosure as defined in claim 12 with a pair of end plates having openings defining two spaced cable passages.

14. A cable enclosure as defined in claim 13 with a pair of end plates having no openings.

15. A cable enclosure as defined in any of claims 12–14 wherein said housing member end sections include a channel formed therein for slidingly receiving an end plate.

16. A cable enclosure as defined in claim 15 wherein said end sections and said end plates include interengaging latch means for latching an end plate in the channel of an end section.

17. In a cable enclosure for enclosing electrical cable splices, an elongate housing having first and second housing members each having first and second spaced edges, with said housing members joined together along said first edges for movement between a housing closed condition and a housing open condition,
said housing members having end sections which cooperate to close an end of said housing when in said closed condition, said cooperating end sections including replaceable end plates with a pair of end plates having openings defining a cable passage.

18. A cable enclosure as defined in claim 17 with a pair of end plates having openings defining two spaced cable passages.

19. A cable enclosure as defined in claim 18 with a pair of end plates having no openings.

20. A cable enclosure as defined in any of claim 17–19 wherein said housing member end sections include a channel formed therein for slidingly receiving an end plate.

21. A cable enclosure as defined in claim 20 wherein said end sections and said end plates include interengaging latch means for latching an end plate in the channel of an end section.

22. In a cable enclosure for enclosing electrical cable splices, the combination of:
an elongate housing having first and second housing members each having first and second spaced edges, with said housing members joined together along said first edges for movement between a housing closed condition and a housing open condition;
an elongate header having attachment means for attachment said header to a messenger cable;
said housing members further including closure means for joining said housing members together adjacent said second edges with said header therebetween;
suspension means connected between said header and one of said housing members for supporting said housing members from said header when in said open condition; and
an electrical conducting ground bar carried by said header with said header attachment means providing an electrical path between said ground bar and the messenger cable, said ground bar including a flange with suspension openings, and
said suspension means including a housing line attached at one end to a housing member and having the other end threaded through suspension openings for adjusting the position of said housing with respect to said header when in said open condition;
said housing members having end sections which cooperate to close an end of said housing when in said closed condition, with cooperating end sections including replaceable end plates with a pair of end plates having openings defining a cable passage, with said housing member end sections including a channel formed therein for slidingly receiving an end plate, and with said end sections and said end plates including interengaging latch means for latching an end plate in the channel of an end section.

23. A cable enclosure as defined in claim 22 including spaced upwardly projecting first ribs on said header and upwardly projecting second ribs on said housing members adjacent said second edges, with said second ribs abutting said first ribs when said housing members are in said closed condition, and said closure means includes means for urging said second ribs of opposed housing members against the intervening first ribs, and
a latch bar carried on said header and projecting laterally from said header, and said housing members include latch means engageable with said projecting latch bar when a housing member second edge is positioned in a header slot.

* * * * *